(12) United States Patent
Hashi et al.

(10) Patent No.: US 10,105,637 B2
(45) Date of Patent: Oct. 23, 2018

(54) ADSORBENT REGENERATION METHOD

(71) Applicants: Mohamed Hashi, Tonawanda, NY (US); Cem E. Celik, Grand Island, NY (US); James R. Dray, Buffalo, NY (US)

(72) Inventors: Mohamed Hashi, Tonawanda, NY (US); Cem E. Celik, Grand Island, NY (US); James R. Dray, Buffalo, NY (US)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 74 days.

(21) Appl. No.: 15/268,704

(22) Filed: Sep. 19, 2016

(65) Prior Publication Data

US 2017/0087505 A1    Mar. 30, 2017

Related U.S. Application Data

(60) Provisional application No. 62/232,572, filed on Sep. 25, 2015.

(51) Int. Cl.
*B01D 53/04* (2006.01)
*B01D 53/047* (2006.01)
*B01D 53/26* (2006.01)

(52) U.S. Cl.
CPC ....... *B01D 53/0462* (2013.01); *B01D 53/047* (2013.01); *B01D 53/0423* (2013.01); *B01D 53/261* (2013.01); *B01D 2253/104* (2013.01); *B01D 2253/106* (2013.01); *B01D 2253/108* (2013.01); *B01D 2253/116* (2013.01); *B01D 2257/504* (2013.01); *B01D 2259/40045* (2013.01); *B01D 2259/40054* (2013.01); *B01D 2259/40066* (2013.01); *B01D 2259/4141* (2013.01); *Y02C 10/08* (2013.01)

(58) Field of Classification Search
CPC ............ B01D 53/0423; B01D 53/0462; B01D 53/047; B01D 53/261; B01D 2253/104; B01D 2253/106; B01D 2253/108; B01D 2253/116; B01D 2257/504; B01D 2259/40045; B01D 2259/40054; B01D 2259/40066; B01D 2259/4141
USPC ................ 95/95, 97, 99, 104, 106, 115, 148
See application file for complete search history.

(56) References Cited

U.S. PATENT DOCUMENTS

| | | | |
|---|---|---|---|
| 4,045,191 A | 8/1977 | Martin | |
| 4,409,006 A * | 10/1983 | Mattia | .............. B01D 53/06 95/113 |
| 5,614,000 A | 3/1997 | Kalbassi et al. | |
| 5,766,311 A | 6/1998 | Ackley et al. | |

(Continued)

*Primary Examiner* — Frank M Lawrence, Jr.
(74) *Attorney, Agent, or Firm* — Ralph J. Mancini

(57) ABSTRACT

In a cyclic adsorptive gas purification process, an impurity laden adsorbent is regenerated by exposing it first to an unheated gas for a pre-determined time period to desorb at least some of the impurity, followed by heating the adsorbent using a flowing stream of a heated gas to desorb the remaining impurities over another pre-determined time period, further followed by cooling of the adsorbent using a flowing stream of gas for yet another pre-determined time period to make it ready for repeating the adsorptive cycle. Introducing an unheated purge stream reduces the energy requirements for the regeneration step compared to a traditional TSA process.

17 Claims, 3 Drawing Sheets

(56) References Cited

U.S. PATENT DOCUMENTS

| | | | |
|---|---|---|---|
| 5,846,295 A | 12/1998 | Kalbassi et al. | |
| 5,885,650 A | 3/1999 | Melody et al. | |
| 6,402,809 B1 | 6/2002 | Monereau et al. | |
| 7,846,237 B2 | 12/2010 | Wright et al. | |
| 8,690,990 B2 | 4/2014 | Nakamura et al. | |
| 2003/0037672 A1* | 2/2003 | Sircar | B01D 53/0462 95/96 |
| 2005/0217481 A1* | 10/2005 | Dunne | B01D 53/06 95/113 |
| 2012/0011887 A1* | 1/2012 | Nakamura | B01D 53/0462 62/640 |
| 2012/0042689 A1* | 2/2012 | Bresler | B01D 53/0438 62/611 |

* cited by examiner

Fig. 2 - PRIOR ART

ADSORBENT REGENERATION METHOD

RELATED APPLICATION

This application claims the benefit of U.S. Provisional Application Ser. No. 62/232,572, filed on Sep. 25, 2015, which is incorporated herein by reference.

FIELD OF THE INVENTION

The present invention relates to a cyclic adsorptive gas purification process and system for removing impurities from a feed gas stream. More particularly, the present invention relates to minimizing energy usage in the regeneration step.

BACKGROUND

Cyclic adsorptive gas purification processes typically employ one of two general classes of adsorption systems, namely: temperature swing adsorption (TSA) systems and pressure swing adsorption (PSA) systems. These adsorption systems typically contain two or more adsorbers that contain adsorbents for removal of impurities from a feed gas. The adsorbers are usually described to be operating in a production state also referred to as an adsorption state or in the regeneration state. The adsorber in the production state is also referred to as being on-line. The adsorber in the regeneration state is also referred to as being off-line. In the production state of both TSA and PSA systems, a feed gas stream is contacted with an adsorbent bed in the adsorber to produce a purified gas stream. The adsorber may contain one or more adsorbents. A given adsorbent selectively adsorbs one or more impurities present in the feed gas stream. At the end of the production state, the flow of feed gas to the adsorber is shut off. In the regeneration state of both TSA and PSA systems, the contaminant laden adsorbent bed is exposed to a flow of regeneration gas which facilitates desorption of impurities from the adsorbent and removal of desorbed impurities out of the adsorber. The regeneration gas in the regeneration state conventionally flows in a direction counter current to that of the feed gas flow in the production state. In the TSA system, the regeneration gas employed is a heated regeneration gas, provided at a temperature higher than that of the feed gas. Typically the temperature of heated regeneration gas is in the range of about 200° F. to about 600° F. The heated regeneration gas heats the adsorbent and facilitates regeneration of the adsorbent by desorption of impurities. The adsorbent has a lower adsorptive capacity at higher temperature. The heated regeneration gas also serves as a hot purge gas that removes the desorbed impurities from the adsorber. The PSA system in an air separation plant employs a waste nitrogen stream produced within the air separation plant as regeneration gas. The waste nitrogen is typically at a temperature close to the feed air temperature, and is provided to the PSA system at a pressure above the atmospheric pressure, sufficient to overcome the pressure drops and to be able to be discharged to the atmosphere. The adsorbed impurities in the PSA are desorbed due to the lower adsorptive capacity at lower pressures. The PSA regeneration gas serves as a purge gas that facilitates the regeneration of the adsorbent by desorption of impurities and removal of the desorbed impurities from the adsorber.

The cyclic adsorptive gas purification system can contain one or more adsorbers. By using at least two adsorbers in a parallel arrangement, the cyclic adsorptive gas purification system can be operated in a continuous mode; for example one adsorber can be operated in an adsorption state while the other adsorber is being regenerated and their roles are periodically reversed in the operating cycle, with equal periods being devoted to the adsorption state and to the regeneration state. Typically, such systems contain adsorbers that are substantially cylindrical in shape, and may have their axis with respect to feed flow as axial (vertical or horizontal), or of the radial type.

A conventional TSA process cycle for purifying air is generally described to contain the following steps: a) production of purified air by adsorption of impurities in feed air flowing through an adsorber at super atmospheric pressure and at ambient temperature for a pre-determined time period; b) initiating regeneration of the adsorbent by stopping the feed air flow and depressurizing the adsorber to a lower operating pressure, typically near atmospheric pressure; c) regeneration of the adsorbent in the depressurized adsorber by flowing a heated regeneration gas also referred to as hot purge gas for a pre-determined time period; an example of a heated regeneration gas is waste nitrogen produced in the air separation unit that is heated by means of one or more heaters/heat exchangers; d) cooling the regenerated adsorbent in the adsorber to push out residual heat in the adsorbent bed by flowing cool waste nitrogen; e) repressurizing the adsorber with purified air coming, for example, from another adsorber in the production phase; f) bringing the repressurized adsorber on-line and repeating steps (a) thru (e). Less conventionally, the regeneration may be carried out at a pressure substantially different from atmospheric pressure, either greater or even less than the ambient pressure by using suitable vacuum pumping means.

A conventional PSA process cycle for purifying air is usually described to contain: a) production of purified air by adsorption of impurities in feed air flowing through an adsorber at super atmospheric pressure for a pre-determined time period; b) initiating regeneration of the adsorbent by stopping feed air flow and depressurizing the adsorber to a lower operating pressure, typically near atmospheric pressure; c) regeneration of the adsorbent in the depressurized adsorber by flowing a purge gas for a pre-determined time period; an example of a purge gas is waste nitrogen produced in the air separation unit; d) repressurizing the adsorber with purified air coming, for example, from another adsorber in production phase; e) bringing the repressurized adsorber on-line and repeating steps (a) thru (d). The PSA process cycle is distinguished from the TSA process cycle in that the regeneration gas is not heated. Adsorbent bed cooling step is not required since the adsorbent doesn't get heated by the regeneration gas. The PSA cycle time is typically much shorter compared to the TSA cycle time.

Hybrid solutions such as thermally enhanced PSA (TEPSA) and thermal pressure swing adsorption (TPSA) have also been proposed as improvements to conventional PSA process cycle employed for air prepurification. A TEPSA system such as that described in U.S. Pat. No. 5,614,000 utilizes a two stage regeneration process in which previously adsorbed water is desorbed by PSA and at least a portion of previously adsorbed carbon dioxide is desorbed by TSA. In this process, desorption occurs by feeding a regeneration gas at a pressure lower than the feed stream and a temperature greater than the feed stream and subsequently replacing the hot regeneration gas by a cool regeneration gas. The heated regenerating gas allows the cycle time to be extended as compared to that of a conventional PSA system.

However, the temperature of heated regeneration gas and cycle time of TEPSA is considerably lower than that of a conventional TSA.

The TPSA systems described in U.S. Pat. No. 5,885,650 and U.S. Pat. No. 5,846,295 relates to improvements to a conventional TSA. The adsorbent is first regenerated for a shorter time period using a regeneration gas heated to a much lower temperature and then purged with cool gas for a longer time period to desorb more of the remaining impurities loaded on the adsorbent.

The higher temperatures employed in TSA, TPSA and TEPSA systems may require the use of insulated vessels, a regeneration gas preheater and a precooler. The temperatures needed for the regenerating gas could range from about 200° F. to about 600° F., placing a more stringent and costly mechanical specification for the system, which increases costs. Typically, there will be more than one unwanted gas component which is removed in the process and generally one or more of these components will adsorb strongly than others on a particular adsorbent. The higher temperatures used for regenerating need to be sufficiently elevated for desorption of more strongly adsorbed component. In operation, there is extra energy cost associated with heating the regeneration gas.

Improvements to reduce energy costs have been proposed, for example U.S. Pat. No. 8,690,990 discloses a temperature swing adsorption process with two parallel purge flows, one through the sieve layer and the other through the alumina layer. The parallel purge step removes moisture from the moisture removal layer at the beginning of the regeneration cycle where as in the traditional TSA processes, the heated regeneration gas or hot purge gas first flows through the carbon dioxide removal layer followed by the water removal adsorbent layer; U.S. Pat. No. 5,766,311 describes yet another approach that uses multiple thermal pulses; U.S. Pat. No. 6,402,809 relates to an optimization approach that involves controlling, modifying and/or regulating the duration of cycle steps depending on at least one operating condition to minimize energy requirements; U.S. Pat. No. 7,846,237 describes yet another optimization approach that involves continuous monitoring of feed gas composition and accordingly adjusting cycle time to minimize energy usage.

The present invention aims to improve the known cyclic adsorptive gas purification processes, particularly TSA air purification process, by appreciably reducing the amount of energy consumed. The present invention modifies the regeneration state steps to save energy by using an unheated regeneration gas stream to desorb impurities prior to exposing the contaminant laden adsorbent bed to a heated regeneration gas stream.

Typically thermal swing adsorption (TSA) systems in cryogenic air separation plants also referred to as prepurification units or prepurifiers produce purified air for distillation at cryogenic temperatures by adsorbing impurities in feed air. These TSA systems utilize a heated desorption step to desorb the impurities and regenerate the adsorbent. The heated desorption step utilizes a hot purge gas that is at a temperature considerably higher than the feed gas temperature to promote desorption of impurities and regenerate the adsorbent. This is then followed by a cooling step that involves flowing a near ambient temperature gas to cool the adsorbent, push out the heat front through the adsorbent bed, and make it ready for adsorption step. The hot desorption step requires a significant amount of energy to desorb impurities and regenerate the adsorbent to a desired level. Any technology that would lower the energy requirements of the TSA process would have a significant economic benefit. Requiring less regeneration energy would allow for lower operating costs and the potential to design smaller heat exchangers and heaters which would save on capital costs. Thus the general problem to be solved is to reduce the energy usage in the regeneration state while achieving the same degree of impurities removal from feed air.

This invention aims at minimizing the regeneration state energy requirement by modifying the regeneration process steps, more particularly by introducing an unheated desorption step before the heated desorption step. The unheated desorption step can desorb certain amount of impurities, resulting in reduced amount of impurities to be desorbed by the heated desorption step, and hence reduced energy requirements. In the heated desorption step the adsorbent is heated to a pre-determined maximum temperature in the range of about 200° F. to about 600° F., preferably in the range of about 300° F. to about 500° F., and more preferably about 400° F. to assure regeneration of adsorbent to a desired level.

With these and other objects in mind, the invention is hereinafter described in detail and the novel features thereof being particularly pointed out in the appended claims.

SUMMARY OF THE INVENTION

The present invention relates to an energy efficient adsorptive cycle for purification of a gas stream. More particularly, the present invention relates to the energy efficiency of adsorbent regeneration in the adsorptive cycle. In accordance with the present invention, the energy efficient adsorbent regeneration process for purification of feed air to a cryogenic distillation system in an air separation plant comprises: feeding pressurized air for a first pre-determined time period to an adsorber operating at a first pressure to adsorb impurities in feed air onto one or more adsorbents within the adsorber; stopping pressurized air flow to the adsorber and depressurizing the adsorber to a second pressure that is lower than the first pressure; regenerating one or more adsorbents in a first regeneration step by flowing unheated regeneration gas through the adsorber operating at the second pressure for a second pre-determined time period; further regenerating the one or more adsorbents in a second regeneration step by flowing heated regeneration gas through the adsorber operating at the second pressure for a third pre-determined time period; cooling the one or more adsorbents by flowing an adsorbent cooling gas through the adsorber at the second pressure for a fourth pre-determined time period; stopping the adsorbent cooling gas flow, and repressurizing the adsorber to the first pressure to begin feeding pressurized air.

In accordance with the present invention, an adsorber can contain an alumina containing adsorbent primarily for removing water present in feed air, and a molecular sieve adsorbent such as 13× primarily for removing carbon dioxide present in feed air. The alumina containing adsorbent and the molecular sieve adsorbent are loaded in the adsorber such that feed air first flows through the alumina layer also referred to as alumina bed then flows through the molecular sieve layer also referred to as molecular sieve bed to produce a purified air stream. The present invention can be utilized in a thermal swing adsorption (TSA) system configured to utilize two or more adsorbers to produce a continuous stream of purified air, or a single adsorber to operate in a batch mode.

In accordance with the present invention, the adsorber operating pressure when processing pressurized feed air can be in the range of about 30 psia to about 600 psia and higher, and the first pre-determined time period (production state time period or on-line time period) can be in the range of about 4 hours to 10 hours. The pressurized feed air can be at a temperature within 10° F. of the ambient temperature. At the end of the production state time period, flow of pressurized feed air to the adsorber is stopped and the adsorber depressurized from the production state operating pressure to a second pressure that can be in the range of about 1 psi to 7 psi above atmospheric pressure, preferably in the range of about 1 psi to 5 psi above atmospheric pressure. The gas that remained in the adsorber at the conclusion of the production state is vented during the depressurization step. Upon completion of the depressurization step, the one or more adsorbents in the adsorber are subjected to a first regeneration step by flowing unheated regeneration gas through the adsorber operating at the second pressure. The unheated regeneration gas can be at a temperature within 20° F. of the ambient temperature, preferably in the range of about 2° F. to about 30° F. below the pressurized feed air temperature. The unheated regeneration gas can be formed from an impure nitrogen stream produced in the air separation plant at a temperature in the range of about 2° F. to about 30° F. below the pressurized feed air temperature. The impure nitrogen stream can contain argon and/or oxygen as impurities. The first regeneration step also referred to as unheated desorption step can be carried out for a second pre-determined time period that can be in the range of about 5% to about 30% of the total regeneration state cycle time. For example, when the total regeneration state cycle time is 4 hours then the unheated desorption step time can range from 12 minutes to 72 minutes, and when the total regeneration state cycle time is 10 hours then the unheated desorption step time can range from about 30 minutes to about 3 hours. Preferably, the second pre-determined time period can be in the range of about 10% to about 30%, and more preferably about 15% to about 25%. The total regeneration state cycle time is equal to the first pre-determined time period (production state time period). Upon completion of the unheated desorption step, the one or more adsorbents are subjected to a second regeneration step by flowing a heated regeneration gas through the adsorber operating at the second pressure. The heated regeneration gas can be at a temperature in the range of about 200° F. to about 600° F., preferably in the range of about 300° F. to about 500° F., and more preferably about 400° F. to assure regeneration of the adsorbent to a desired level. The heated regeneration gas can be formed by heating the impure nitrogen stream produced in the air separation plant. The heating of the impure nitrogen stream can be carried out in a steam heater, or an electric heater, or a heat exchanger utilizing a hot stream to supply the heat. The second regeneration step also referred to as heated desorption step can be carried out for a third pre-determined time period that can be in the range of about 10% to about 40% of the total regeneration state cycle time, that is equal to the first pre-determined time period (production state cycle time). For example, when the total regeneration state cycle time is 4 hours then the heated desorption step time can range from 24 minutes to 96 minutes, and when the total regeneration state cycle time is 10 hours then the heated desorption step time can range from about one hour to about four hours. More preferably the second regeneration step, heated desorption step time can be carried out for a second pre-determined time period that can be in the range of about 15% to about 30%. Upon completion of the heated desorption step, the heat source can be switched off. The one or more adsorbents in the adsorber are now subjected to adsorbent cooling step by flowing impure nitrogen stream as adsorbent cooling gas into the adsorber operating at the second pressure. The adsorbent cooling step is carried out for a fourth pre-determined time period. The total time of the unheated desorption step (second pre-determined time period), heated desorption step (third pre-determined time period), and adsorbent cooling step (fourth pre-determined time period) can be in the range of about 90% of the first pre-determined time period to about 95% of the first pre-determined time period. Upon completion of the adsorbent cooling step, the flow of adsorbent cooling gas is stopped and the adsorber repressurized to the first pressure to begin feeding pressurized air.

The present invention relates to an energy efficient thermal swing adsorption (TSA) process that differs from a conventional TSA process in the regeneration state process steps. The desorption of impurities is carried out in two steps. The first regeneration step is an unheated desorption step and the second regeneration step is a heated desorption step. The unheated desorption step is introduced before the heated desorption step to reduce the energy requirements for adsorbent regeneration. The energy efficient TSA process cycle includes the steps of blend, feed, depressurization, unheated desorption, heated desorption, adsorbent cooling, and repressurization. Using an unheated regeneration gas (unheated desorption step) right after the feed and depressurization steps, a portion of the adsorbed impurities such as carbon dioxide and water can be desorbed because of the lower adsorptive capacity at the lower operating pressure. Desorption of impurities is primarily due to the lower adsorptive capacity of the adsorbent at the lower operating pressure of the unheated desorption step. The unheated regeneration gas flowing through the adsorber promotes desorption of impurities due to the lower partial pressure of the impurities in the gas in contact with the adsorbent. The unheated regeneration gas also serves as a purge gas that removes the desorbed impurities from the adsorber. The unheated desorption step can regenerate the adsorbent only to a limited extent. The TSA adsorbent beds are typically configured for long cycle times, the production state time period during which the impurities in feed air get loaded on to the adsorbent being several times that of the unheated desorption step time period. An adsorber at the conclusion of production state undergoes depressurization as a first step to regenerate the adsorbent also referred to as adsorbent bed. Once depressurization from a production state pressure that can range anywhere from about 30 psia to about 600 psia to a regeneration state pressure of around atmospheric pressure is complete, an unheated regeneration gas is introduced into the adsorber. The unheated regeneration gas flows into the adsorber through the product end and discharges through the feed end, countercurrent to the production state feed air flow. The unheated regeneration gas flow purges desorbed impurities from the adsorber. The unheated regeneration step promotes desorption of impurities from the adsorbent by allowing lower partial pressures of the impurities in the gas in contact with the adsorbent. After completion of unheated desorption step, a heated regeneration gas is introduced to begin the heated desorption step to desorb more contaminants, primarily because of the lower adsorptive capacity at higher temperature. The bed cooling step then follows to cool the adsorbent, and to push the heat front out of the adsorbent bed in order for the adsorbent bed to be cool enough to handle the repressurization and feed steps. Cooling the adsorbent to a certain temperature is important. A significant amount of residual heat in the adsorbent bed would lower the efficiency for adsorption during feed step and also cause the purified air leaving the adsorber to be at a temperature high enough to lower the efficiency of the downstream equipment. This would increase the compression energy requirement for all or portions of purified air in the downstream production section. Also more refrigeration may be needed, either externally supplied or generated by turboexpansion within the downstream production section.

The time allocated for unheated desorption step depends on several factors, including how effectively the bed cooling step can cool the adsorbent and push out the residual heat left in the adsorbent bed within the allotted time for adsorbent cooling step. If less time is needed to cool the adsorbent bed to a desired bed temperature then the time allocated for unheated desorption step can be increased which would increase the potential energy savings.

BRIEF DESCRIPTION OF THE FIGURES

While the specification concludes with claims distinctly pointing out the subject matter that applicants regard as their invention, it is believed that the invention would be better understood when taken in connection with the accompanying figures wherein like numbers denote same features throughout and wherein:

DETAILED DESCRIPTION OF THE INVENTION

Air Separation Plant

Figure 1:
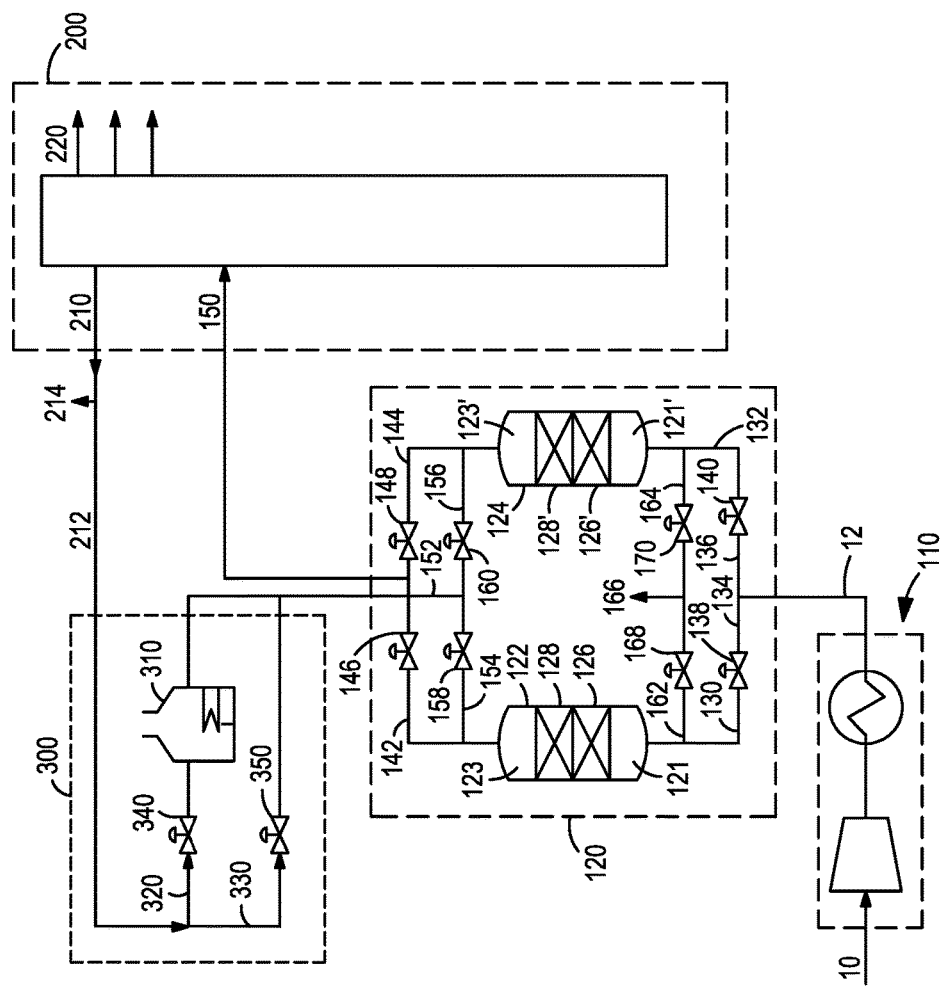
FIG. 1 shows a schematic of an air separation process that can use the invention.

With reference to FIG. 1, an air separation plant 1 is illustrated in which a feed air stream 10 is compressed in a main air compression section 110 to provide a pressurized air feed stream 12 to a prepurification unit 120. The main air compression section 110 is configured to contain a plurality of compressors arranged serially or in parallel or combinations thereof to deliver pressurized air feed stream 12 at a pressure in the range of about 30 psia to about 600 psia or higher. The number of compressors in the main air compression section 110 will depend on several factors including compressors arrangement, pressure ratio across individual compressor, air flow rate, ambient conditions and final delivery pressure. The individual compressors or a group of compressors in the main air compression section 110 can be powered in a known manner by electric motor, steam turbine, or other mechanical driver. In some embodiments of the invention one or more compressors can be configured to be driven directly by an electric motor, preferably permanent magnet high speed motor. The main air compression section 110 further includes intercoolers to provide interstage cooling between compressors, at least one aftercooler to provide cooling of air discharged from the final stage of compression, and means for collecting and discharging condensate streams. Such cooling duty can be provided entirely by water cooled heat exchanger or by employing refrigerant circuit(s) that provide entire cooling duty or only a portion such as cooling the air at the warm end (that is from compressor discharge temperature to a lower intermediate temperature) and then the balance of cooling by water cooled heat exchanger.

The prepurification unit 120 receives pressurized air feed stream 12 from the main air compression section 110 and delivers purified air stream 150 to a downstream production section 200 in the air separation plant 1. The prepurification unit 120 also receives a regeneration gas stream 152 from a regeneration gas source 300.

The prepurification unit 120 (temperature swing adsorption unit) includes two adsorbers 122 and 124 containing adsorbents, associated conduits and valves arrangement configured for temperature swing adsorption (TSA) mode of operation in a predefined manner. Adsorbers 122 and 124 can be configured to be substantially cylindrical in shape preferably containing a bed of alumina adsorbent 126 or 126' (also referred to as alumina layer) to adsorb the moisture in the feed gas followed by a bed of a molecular sieve adsorbent 128 or 128' (also referred to as molecular sieve layer) such as 13× to adsorb carbon dioxide, hydrocarbons and other impurities. Feed air is introduced at one end of the adsorber, from here on referred to as feed end 121 or 121', flows through the alumina layer, then through the molecular sieve layer, and then flows out of the adsorber as purified air from another end, from here on referred to as product end 123 or 123'. These adsorbers may optionally contain one or more temperature probes (not shown) either internal or external to the adsorber; for example one probe may be installed to sense the temperature inside the adsorber at the feed end and another probe may be installed to sense the temperature inside the adsorber at the product end. Even though two adsorbers are shown in FIG. 1, those skilled in the art could use the present invention in a system utilizing a single adsorber or more than two adsorbers.

In the production state, pressurized feed air stream 12 may be directed towards both or either of the two adsorbers 122 and 124 by means of conduits 130, 132 as streams 134 and 136, respectively. Valves 138 and 140 control the flow of air entering the adsorbers 122 and 124. The purified air is discharged from the adsorbers 122 and 124 through conduits 142 and 144 that contain valves 146 and 148 to control the flow of purified air stream. Both conduits 142 and 144 are manifolded to supply purified air stream 150 to the downstream production section 200. The adsorber that is processing all of the feed air to produce purified air is said to be in feed step. If the feed air is divided between the two adsorbers to produce a combined stream of purified air then these adsorbers are said to be in blend step.

In the regeneration state, regeneration gas stream 152 may be directed towards adsorber 122 or 124 through conduits 142 and 144 as streams 154 and 156, respectively to regenerate the adsorbents contained in them. Flow of streams 154 and 156 is controlled by valves 158 and 160, respectively. A more or less continuous purge stream laden with desorbed water vapor and carbon dioxide flows out of the adsorber 122 through conduit 162 or adsorber 124 through conduit 164 and is discharged as stream 166 which can be vented to atmosphere. Flow within conduits 162 and 164 is controlled by valves 168 and 170, respectively.

The prepurification unit 120 is configured to operate in TSA mode. In such unit, air purification can be accomplished using adsorbents that may be arranged as discrete beds or layers, as mixtures, composites or combinations thereof. The adsorbents used are, without being limiting, zeolites, activated aluminas, silica gels, exchanged zeolites, doped aluminas, etc. In a process for removal of contaminants from a gas mixture by adsorption, it is common to adsorb contaminants successively in the order of decreasing adsorptivity and/or decreasing selectivity with respect to a chosen adsorbent. The effectiveness of such a process can often be improved by using a combination of adsorbents, configured in layers or mixtures, to enhance the removal of each contaminant, i.e. by selecting particular adsorbents to achieve maximum adsorptivity and/or selectivity of each contaminant relative to the gas mixture. The use of different adsorbents disposed in layers in the adsorber is well known in the art. The selection of an adsorbent to remove a particular contaminant depends upon many factors, e.g. the type and composition of both the targeted contaminant and other gases in the mixture at the point of removal within the adsorber, the relative selectivity of the adsorbent for the contaminant(s) and non-contaminants, and the loading capacity of the adsorbent for the contaminant. In air separation plants, the prepurification unit for water and carbon dioxide removal typically contains a first layer of activated alumina to remove water and a second layer of molecular sieve to remove carbon dioxide.

The regeneration gas source 300 is configured to receive at least a portion of an impure nitrogen stream 210 as stream 212 from the downstream production section 200 in the air separation plant 1. The impure nitrogen stream 210 typically contains oxygen and argon as impurities. Stream 214 (remaining portion of impure nitrogen stream 210) is vented. The regeneration gas source 300 contains a heater arrangement 310 with associated conduits 320 and 330 and valves 340 and 350 for providing heated and/or unheated gas to form regeneration gas stream 152. The heater arrangement 310 contains an electric heater or a steam heater or a heat exchanger or combinations thereof.

The downstream production section 200 in the air separation plant is configured in a manner well known to those skilled in the art to produce an impure nitrogen stream 210, and one or more of oxygen product, nitrogen product, and argon product from purified air stream 150 by cryogenic distillation. The cryogenic distillation system can be configured to contain two or more distillation columns to produce the desired product slate. The impure nitrogen stream 210 is formed by warming an enriched nitrogen stream leaving the cryogenic distillation system against cooling purified air in a primary heat exchanger within the downstream production section 200. The impure nitrogen stream 210 contains impurities such as oxygen and argon; in the art of cryogenic distillation of air, this stream is also referred to as waste nitrogen. The impure nitrogen stream 210 serves as the source of regeneration gas 152 also referred to as purge gas; it is free of moisture and carbon dioxide.

TSA Process Cycle

A conventional TSA prepurifier process has two general states. In a first state, the two adsorber system shown in FIG. 1, adsorber 122 or 124 or both may be "on-line". When only one adsorber is receiving feed air then that adsorber is said to be in "Feed" step, producing all the purified air supplied to the downstream production unit in the air separation plant. When both adsorbers are receiving feed air then those adsorbers are said to be in "Blend" step, each contributing to the purified air supplied to said downstream production unit. While on-line, the adsorber removes impurities such as water and carbon dioxide in the feed air by adsorption. The adsorber that is not "on-line" is in an "off-line" or regeneration state. Such regeneration state includes four distinct steps, in the following order: depressurization; adsorbent regeneration by desorption at an elevated temperature compared to the feed temperature; adsorbent cooling; and adsorber re-pressurization. In order to conduct these various steps, various valves shown in FIG. 1 are opened or closed to provide the necessary fluid flow pathways or isolation in a periodic fashion in order to create a continuous product air stream.

A heat source is required to increase the temperature of the regeneration gas to a desired elevated temperature, in the range of about 200° F. to about 600° F. which is needed to be able to regenerate the adsorbent fully. All or a portion of waste nitrogen 210 produced in the downstream production unit 200 is provided as stream 212 to the regeneration gas source 300. Immediately following depressurization of the adsorber, the regeneration gas source 300 provides a heated regeneration gas at a temperature of about 200° F. to about 600° F. to the adsorber as stream 152. Depending on which adsorber is receiving the heated regeneration gas, valve 158 or valve 160 is opened; the gas is allowed to flow for a pre-determined period, followed by switching off the heat source. Waste nitrogen stream 212 now bypasses the heater 310 and is introduced as stream 152 into the off-line adsorber to cool the adsorbent. The adsorbent cooling step is conducted for a pre-determined time period to cool the adsorbent to a desired temperature prior to switching the adsorber from off-line state to on-line state and repeating the cycle.

A TSA cycle for removing impurities such as water and carbon dioxide from air is designed to operate an adsorber in the production state or in the regeneration state for a pre-defined time period referred to as cycle time, typically in the range of about 4 hours to about 10 hours. In the production state, the adsorber produces a purified air stream from feed air. In the regeneration state, the impurities laden adsorbent in the adsorber is regenerated at elevated temperatures by desorbing the impurities loaded onto the adsorbent during the production state. The time period during which heated regeneration gas flows through the adsorber can range from about 15% to about 50% of the total regeneration state cycle time, with the balance utilized for adsorbent cooling step. For example, when the total regeneration state cycle time is 4 hours then the time period during which heated regeneration gas flows can range from 36 minutes to 2 hours, and when the total regeneration state cycle time is 10 hours then the time period during which heated regeneration gas flows can range from 90 minutes to 5 hours. The flow rate of regeneration gas during the elevated temperature desorption step and the adsorbent cooling step can be the same or different as long as enough regeneration energy is provided and the adsorbent is cooled to a desired temperature prior to starting the next production state. Cycle times under 4 hours have a hard time pushing the heat front through the bed and would require a higher flow rate of regeneration gas during the adsorbent cooling step to cool the adsorbent to a desired temperature within the allocated time. Cycle times above 10 hours are possible but less desirable because of the requirements of significant amount of adsorbent material and a larger vessel which increases capital cost. The cooler gas pushes the heat front through the adsorber to prepare it for the next feed step. Once a sufficient amount of heat is pushed out, as determined for example by a temperature probe on the feed end inside the adsorber, the adsorber is re-pressurized by shutting off the flow of adsorbent cooling gas, stream 152 to the adsorber, and opening and closing appropriate valves to build pressure within the adsorber by: diverting a portion of the purified air stream produced in the "On-line" adsorber, or diverting a portion of the pressurized air stream being fed to the "On-line" adsorber, or combinations thereof. In the on-line mode the adsorber operates at an elevated pressure, for example in the range of about 30 psia to about 600 psia to provide purified air at sufficient pressure for producing one or more of oxygen, nitrogen, and argon products in the downstream production section. During regeneration at elevated temperature the adsorber operates at a pressure close to atmospheric pressure that is sufficient to vent the regeneration gas leaving the adsorber, although any pressure below the on-line mode operating pressure will work. The repressurized adsorber is then brought back "On-line" and the TSA cycle steps are repeated.

Now focusing on the present invention, energy efficient TSA process cycle differs from the conventional TSA cycle described above in the following respects: after depressurization of the adsorber, the adsorbent in the adsorber is first exposed to an unheated regeneration gas for a pre-determined time period (a first regeneration step also referred to as unheated desorption step), then to a heated regeneration gas for another predefine time period (a second regeneration step also referred to as heated desorption step), followed by introducing a cool regeneration gas also referred to as cooling gas or adsorbent cooling gas or adsorbent bed cooling gas to cool the adsorbent. In the unheated desorption step, waste nitrogen stream 212 coming out of the primary heat exchanger in the downstream production section 200 bypasses the heater 310 in the regeneration gas source 300, and is introduced into the adsorber as unheated regeneration gas 152. The waste nitrogen leaving the primary heat exchanger is at a temperature typically in the range of about 2° F. to about 30° F. below the feed air temperature. Thus, the unheated regeneration gas at a temperature of about 2° F. to about 30° F. below the feed air temperature flows through the adsorber for a pre-determined time period (a time period substantially longer than the time required for switching valves) and facilitates desorption of the impurities because of the lower adsorptive capacity at the lower operating pressure. The unheated desorption step time period can be anywhere in the range of about 5% to about 30% of the total regeneration state cycle time, preferably in the range of about 10% to about 30%, and more preferably about 15% to about 25%. For example, when the total regeneration state cycle time is 4 hours then the unheated desorption step time can range from 12 minutes to 36 minutes, and when the total regeneration state cycle time is 10 hours then the unheated desorption step time can range from one hour to five hours. In the second regeneration step, that is the heated desorption step, the waste nitrogen stream 212 is heated in the regeneration gas source 300 by heater 310 to form the heated regeneration gas (also referred to as hot gas or hot purge gas). The heated regeneration gas at a temperature greater than of about 200° F., preferably in the range of about 300° F. to about 500° F., and more preferably in the range of about 400° F. to about 450° F. is introduced into the adsorber as stream 152 that heats the adsorbent and facilitates desorption of more of the impurities due to the lower adsorptive capacity at elevated temperature (flow of the heated regeneration gas in this instance may be for the same time period and at the same flow rate as would have been in a conventional TSA cycle or for a different time period or at a different flow rate).

At the end of the production state, the prepurifier beds are saturated with contaminants. Due to the type of adsorbents utilized in TSA purification, elevated temperature desorption is required to effectively regenerate the beds. Typically the heated regeneration gas heats the adsorbent facilitating desorption of impurities and removes the desorbed contaminants out of the adsorber. The adsorbent cooling step cools the adsorbent, and pushes out the heat front through the prepurifier. The heated desorption step desorbs contaminants because of the lower adsorptive capacity of the heated adsorbent at higher temperatures as well as at lower operating pressures. The unheated desorption step allows for some of the contaminants to be removed because of the lower adsorptive capacity at the lower operating pressures. The extent of contaminants removal depends on several factors including the unheated desorption step time, and the nature of contaminants as shown below by way of comparative examples. After the unheated desorption step, lesser amounts of contaminants remain as adsorbed species on the adsorbent when the heated desorption step begins. Therefore, less regeneration energy will be required for the same level of regeneration to be achieved.

At the conclusion of the heated desorption step, the heat source 310 in the regeneration gas source 300 is switched off, waste nitrogen stream 212 now bypasses the heater, and is introduced into the adsorber as cool regeneration gas 152 to cool the adsorbent. The adsorbent cooling step is carried out for yet another pre-determined time period to push the heat front out of the adsorber. At the conclusion of the adsorbent cooling step, flow of cool regeneration gas to the adsorber is stopped by closing appropriate valves. The adsorber is then re-pressurized and brought on-line.

COMPARATIVE EXAMPLES

Table 1 summarizes results of a case study showing the benefits of the energy efficient TSA cycle regeneration process steps compared to the regeneration process steps of a conventional TSA prepurification process cycle. Regeneration of an adsorber containing 12,900 lbs of alumina and 60,000 lbs of 13× adsorbents after processing 40.2 million standard cubic feet of feed air containing 1176 ppm water and 450 ppm carbon dioxide was studied. The study was conducted using commercial Aspen Adsorption V7.3 modeling software from Aspen Technology, Inc.

Figure 2:
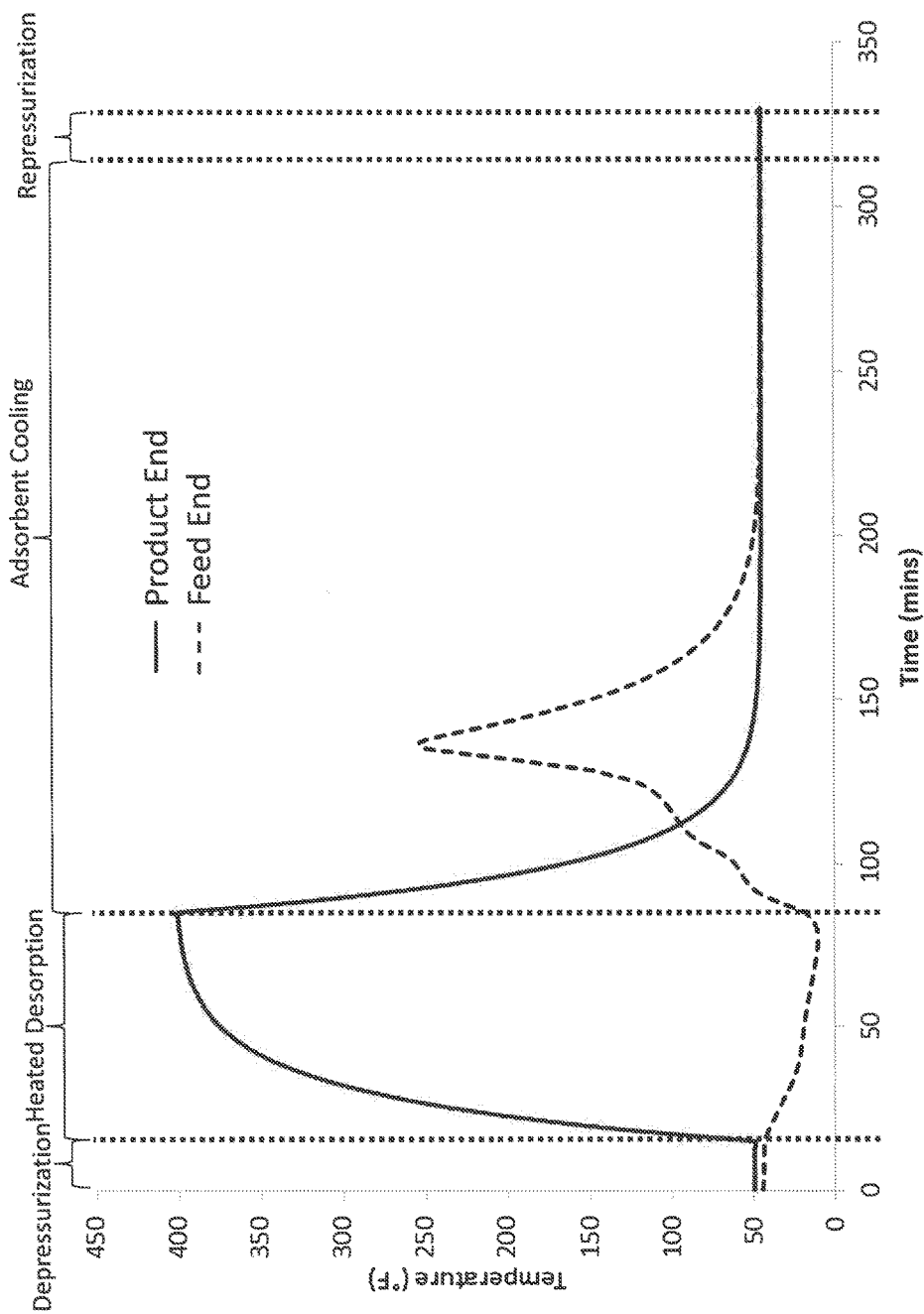
FIG. 2 shows a profile of temperatures at the feed end and the product end of an adsorber as a function of cycle time of conventional TSA process.

Case 1 is the base case, regeneration carried out using various process steps of a conventional TSA process cycle. FIG. 2 shows Case 1 modeling results of temperatures at the feed end and product end as a function of time during various steps in the regeneration state of a conventional TSA process cycle. The depressurization step in the regeneration state was modeled by gradually decreasing the adsorber pressure from a production state operating pressure of 137.7 psia to about ambient pressure, venting any gas that remained in the adsorber at the conclusion of the production state. The heated desorption step was modeled assuming a heated nitrogen gas at a pressure of 17.1 psia and a temperature of 400° F. was introduced into the adsorber from the product end as the heated regeneration gas. The flow rate of heated regeneration gas and heated desorption step time was specified such that a desired amount of energy was introduced into the adsorber to regenerate the alumina and molecular sieve adsorbents. As shown in FIG. 2 the temperature inside the adsorber at the product end gradually increased over time and reached the desired temperature of 400° F. As the regeneration gas progressed through the adsorber, its temperature decreased due to the transfer of heat to the adsorbents, as well as to provide the energy for endothermic desorption of impurities. Thus, as shown in FIG. 2 the temperature inside the adsorber at the feed end during the initial periods of the heated desorption step remained below ambient temperature and then increased to near ambient over time. Once the desired amount of energy was introduced into the adsorber, the flow of heated regeneration gas was stopped, concluding the heated desorption step. The adsorbent cooling step was modeled assuming a cool nitrogen stream at a temperature of 45° F. is introduced into the adsorber from the product end as the adsorbent cooling gas. The flow rate of adsorbent cooling gas and the adsorbent cooling step was specified to push the heat front out of the adsorber. The regenerated adsorbents in the adsorber need to be at a cool enough temperature to make sure the production of purified air in the next production state is not hindered by elevated temperatures. Initially the adsorbent cooling gas temperature increases as it absorbs heat from the heated adsorbents to cool them. Over time the temperature at the feed end reaches a maximum value and then the temperature decreases. The adsorbent cooling step conditions, gas flow rate and step time are specified such that at the conclusion of the step the gas temperature at the feed end is close to the feed air temperature. The repressurization step was modeled assuming introduction of purified air over a specified time period without a temperature rise in the adsorber.

Figure 3:
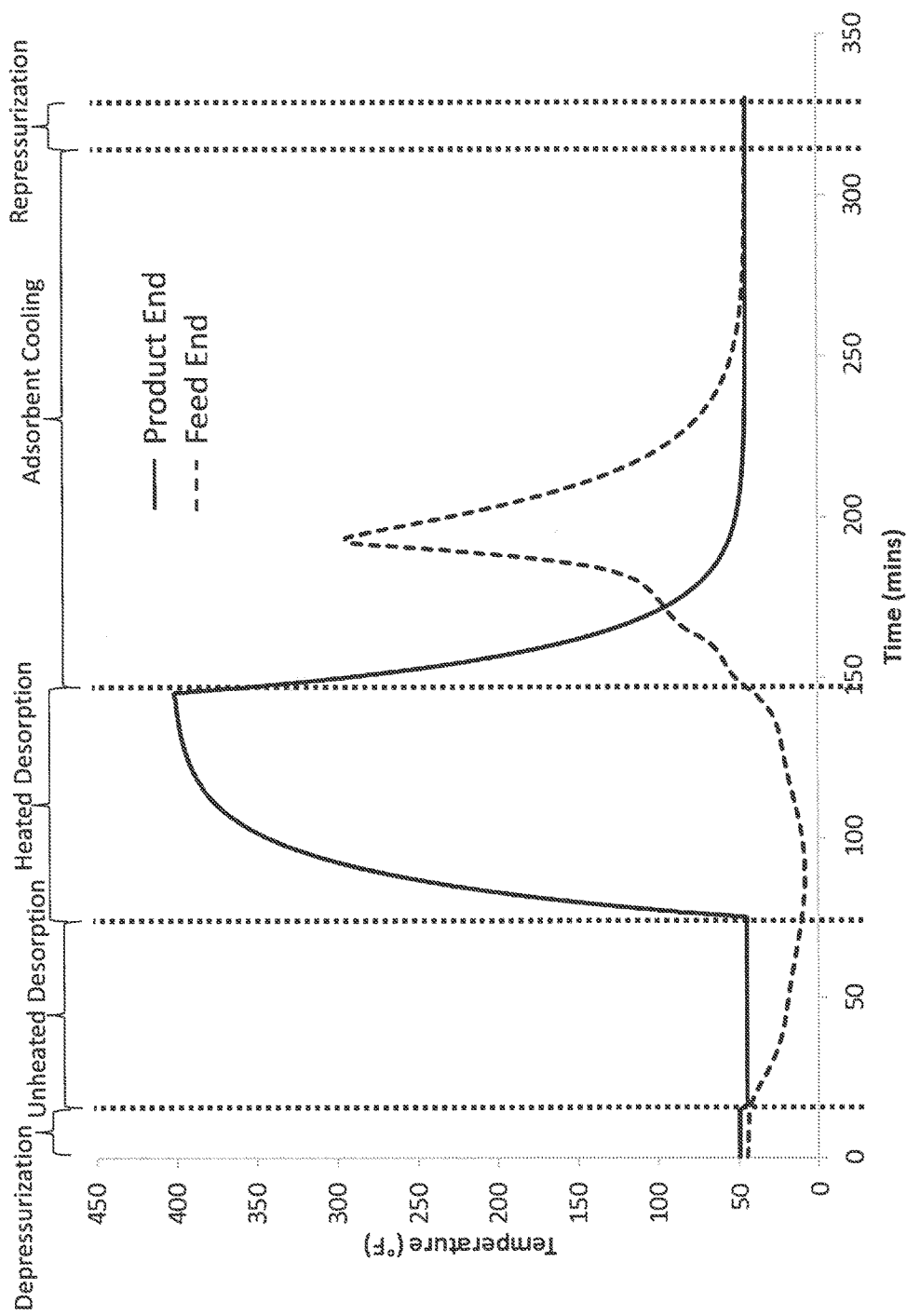
FIG. 3 shows a profile of temperatures at the feed end and the product end of an adsorber as a function of cycle time of this invention, energy efficient TSA process.

Case 2 studied the regeneration using various process steps of the energy efficient TSA process cycle in accordance with the present invention. FIG. 3 shows Case 2 modeling results of temperatures at the feed end and product end as a function of time during various regeneration steps of the energy efficient TSA cycle. The depressurization step was modeled in a manner similar to that of the conventional TSA cycle depressurization step described above. The unheated desorption step was modeled assuming nitrogen as the unheated regeneration gas at a temperature of 45° F. The unheated desorption step process conditions of gas flow rate and step time listed in Table 1 were specified. As shown in FIG. 3 the temperature at the product end remained constant around the unheated regeneration gas supply temperature. The temperature at the feed end during this step, however, decreased over time due to the endothermic desorption of impurities. The unheated desorption step removed about 6.3% of water that alumina adsorbent had adsorbed during the production state, and about 4.8% of carbon dioxide that molecular sieve adsorbent had adsorbed during the production state. The partially regenerated adsorbents were then subjected to the heated desorption step, the adsorbent cooling step, and the repressurization step of the energy efficient TSA cycle in a manner similar to that of the conventional TSA cycle steps described above. The heated desorption step was modeled assuming same process conditions as in Case 1, heated nitrogen as heated regeneration gas at a temperature of 400° F., flow rate of 745 kcfh-ntp, and heated desorption step time of 70 minutes. Thus, the energy input for regeneration of adsorbents in the adsorber in Case 2 remained at the same value as in Case 1. The temperature at the feed end in Case 2, however reached a maximum value of 294° F. compared to 253° F. in Case 1, suggesting potential for energy saving. The adsorbent cooling step in Case 2 was modeled assuming 1350 kcfh-ntp cool nitrogen flow at 45° F. as the adsorbent cooling gas, same as in Case 1. The duration of the adsorbent cooling step in Case 2 was only 170 minutes compared to 230 minutes in Case 1, since 60 minutes were used up in Case 2 to carry out the unheated desorption step. However, the shorter time of 170 minutes was sufficient to cool the adsorbents to about the same temperature as in Case 1, and get them ready for the next production state.

Case 3 studied the regeneration of adsorbents in a manner similar to that of Case 2, using various process steps of the energy efficient TSA process cycle in accordance with the present invention. Case 3 specified 690 kch-ntp nitrogen flow during the unheated desorption step. Even though the nitrogen flow was lower than in Case 2 (745 kcfh-ntp), modeling results indicated same levels of water and carbon dioxide removal from the adsorbents, about 6.3% of water that alumina adsorbent had adsorbed during the production state, and about 4.8% of carbon dioxide that molecular sieve adsorbent had adsorbed during the production state. The heated desorption step in Case 3 used 690 kch-ntp nitrogen as heated regeneration gas, lower flow rate than in Case 2. However, the heated desorption step time in both Case 2 and Case 3 was 70 minutes. Case 3 used the same adsorbent cooling step process conditions as Case 2. Modeling results of temperature profiles at the feed end and product end as a function of time (not shown) were similar as in Case 2 except that the maximum temperature at the feed end was about 253° F., lower than the 294° F. in Case 2. Because of the lower flow rate of heated nitrogen, Case 3 realized an energy savings of 7.4% over the base case (Case 1). Higher maximum temperature at the feed end during the adsorbent cooling step suggest more energy supplied during the heated desorption step than required to desorb the impurities remaining after the unheated desorption step. A desirable value for the maximum temperature can be below 300° F., preferably in the range of about 250° F. to about 275° F. The maximum temperature at the feed end can be used as a parameter for optimizing process conditions of one or more of unheated desorption step, heated desorption step, and adsorbent cooling step to realize energy savings. One way to maintain this maximum temperature at a predefined target value is to reduce the amount of regeneration energy introduced in the adsorber during the heated desorption step. This can be accomplished by decreasing the heated regeneration gas flow, or decreasing heated desorption step cycle time, or combinations thereof. In this study, the flow was reduced but for the purposes of this invention any method of reducing the regeneration energy requirements is within the scope of the invention.

TABLE 1

Regeneration Energy Savings

| | Units | Case 1 | Case 2 | Case 3 |
|---|---|---|---|---|
| Depressurization (D) Time | mins | 15 | 15 | 15 |
| Unheated Desorption (UHD) Time | mins | 0 | 60 | 60 |
| Heated Desorption (HD) Time | mins | 70 | 70 | 70 |
| Adsorbent Cooling (AC) Time | mins | 230 | 170 | 170 |
| Repressurization Time (R) | mins | 15 | 15 | 15 |
| Unheated Regeneration Gas Temperature | ° F. | — | 45 | 45 |
| Unheated Regeneration Gas Flow | kcfh-ntp | — | 745 | 690 |
| Heated Regeneration Gas Temperature | ° F. | 400 | 400 | 400 |
| Heated Regeneration Gas Flow | kcfh-ntp | 745 | 745 | 690 |
| Adsorbent Cooling Gas Temperature | ° F. | 45 | 45 | 45 |
| Adsorbent Cooling Gas Flow | kcfh-ntp | 1350 | 1350 | 1350 |
| Maximum Temperature at Feed end during Adsorbent Cooling Step | ° F. | 253 | 294 | 253 |
| Heated Regeneration Gas Flow/Feed Air Flow | % | 10.4 | 10.4 | 9.7 |
| Energy Savings | % | Base | 0% | 7.4% |

The invention describes reducing the regeneration energy requirements by introducing an unheated desorption step. The example used in the invention was reducing the heated regeneration gas flow in order to achieve the benefits. Other examples that could have been chosen but not limited to are decreasing the heated desorption step time, or adjusting the heated desorption step time and heated regeneration gas flow to create a pulse through the bed, or combinations of single or multiple unheated desorption and heated desorption steps.

Another approach to reduce regeneration energy requirements could be to increase either the unheated regeneration gas flowrate to carry out the unheated desorption step or increase the adsorbent cooling gas flowrate in the adsorbent cooling step that follows the heated desorption step. Increasing the unheated desorption step could increase the amount of contaminants removed which results in lesser amount of impurities to be desorbed to regenerate the adsorbent to a desired level, thus reducing the energy requirements. Increasing the adsorbent cooling gas flow rate or adsorbent cooling time would allow the adsorbent to be cooled more effectively which could enable further lengthening of the unheated desorption step.

The energy efficient TSA process has been described without discussing different options with respect to the adsorbent material used. Numerous types of adsorbent material can be used, examples include: molecular sieves-zeolites, activated alumina, silica gel and activated carbon. Of particular utility for purposes of water removal is activated alumina. It is also known that combinations of adsorbents can be used. In particular, the combination of alumina with synthetic zeolites may be particularly advantageous. The adsorbent material can be deployed within the adsorber as spherical balls, extruded pellets tablets, granules or monoliths.

The invention has been described independent of the shape of the adsorbent beds. It should be noted that conventional systems will utilize adsorbers that may be configured substantially cylindrical in shape. The flow paths are often up to the discretion of the designer. FIG. 1 depicts feed air directed upward through the bed. This need not be the case—it is known that this flow path can be reversed. In addition, it is possible to design such systems wherein the flow path is perpendicular to the axis of the cylindrical adsorber (radial inflow/outflow). Besides vertical adsorbers, the invention can be implemented towards horizontal, radial, spherical and any other geometrically shaped prepurification adsorbers.

The most common adsorption process consists of two beds with one bed undergoing regeneration while the other is on feed. This invention is not limited to systems with only two beds even though the description used a two bed system in the description. Adsorption systems with three or more beds can be configured and operated with an unheated desorption step prior to the heated desorption step.

Implementing this invention requires no capital expenditures and is easy to implement to existing TSA prepurifiers as well. The unheated desorption step, depending on length of time and the unheated regeneration gas flow, will remove a certain percentage of the total contaminants in the bed. When the heated desorption step begins, there is less contaminants to be removed compared to a process without an unheated desorption step. Thus the regeneration energy requirements for the heated desorption step can be reduced without negatively hindering the process compared to the typical TSA cycle. The bed cooling step would need to cool the bed in a shorter amount of time if all other cycle step times are kept constant. Operating costs would decrease due to the lower energy requirements on a retrofit basis. If this technology is implemented during the design phase, the regeneration heater size can be minimized resulting in capital savings.

Although the present invention has been described with reference to preferred embodiments, as will occur to those skilled in the art, changes and additions to such embodiment can be made without departing from the spirit and scope of the present invention as set forth in the appended claims.

We claim:

1. An energy efficient adsorbent regeneration process for the purification of feed air to a cryogenic distillation system in an air separation plant, said process comprising:
   feeding pressurized air for a first pre-determined time period to an adsorber operating at a first pressure to adsorb impurities in feed air onto one or more adsorbents within the adsorber;
   stopping pressurized air flow to the adsorber and depressurizing the adsorber to a second pressure that is lower than the first pressure;
   regenerating one or more adsorbents in a first regeneration step by flowing unheated regeneration gas through the adsorber operating at the second pressure for a second pre-determined time period effective to desorb a portion of the adsorbed impurities due to the lower adsorptive capacity of the adsorbent at the lower operating pressure of the unheated desorption step;
   further regenerating one or more adsorbents in a second regeneration step by flowing heated regeneration gas through the adsorber operating at the second pressure for a third pre-determined time period;
   cooling the one or more adsorbents by flowing adsorbent cooling gas through the adsorber at the second pressure for a fourth pre-determined time period;
   stopping the flow of adsorbent cooling gas and repressurizing the adsorber to the first pressure to begin feeding pressurized air.

2. The process of claim 1 wherein the adsorption pressure is from about 30 to about 600 psia.

3. The process of claim 1 wherein the temperature of the unheated regeneration gas of said first regeneration step is within about 20° F. of ambient temperature.

4. The process of claim 1 wherein the regeneration pressure in said first regeneration step is in the range of about 1 psi to about 5 psi above ambient pressure.

5. The process of claim 1 wherein the unheated regeneration gas comprises nitrogen.

6. The process of claim 1 wherein the said first regeneration step is conducted for a period of time in the range of about 5% to about 30% of the first pre-determined time period.

7. The process of claim 1 wherein the temperature of the heated regeneration gas of said second regeneration step is in the range of from about 300° F. to about 500° F.

8. The process of claim 1 wherein the regeneration pressure in said second regeneration step is in the range of about 1 psi to about 5 psi above ambient pressure.

9. The process of claim 1 wherein the heated regeneration gas comprises nitrogen.

10. The process of claim 1 wherein the said second regeneration step is conducted for a period of time in the range of about 10% to about 40% of the first pre-determined time period.

11. The process of claim 1 wherein the process is a cyclic thermal swing adsorption process.

12. The process of claim 1 wherein the adsorber contains at least two adsorbents.

13. The process of claim 12 wherein one of the adsorbent comprises activated alumina particles and the other adsorbent comprises molecular sieve adsorbent.

14. The process of claim 1 wherein the said first regeneration step is conducted for a period of time in the range of about 10% to about 30% of the first pre-determined time period.

15. The process of claim 1 wherein the said first regeneration step is conducted for a period of time in the range of about 15% to about 25% of the first pre-determined time period.

16. The process of claim 1 wherein the said second regeneration step is conducted for a period of time in the range of about 15% to about 30% of the first pre-determined time period.

17. The process of claim 1 wherein the impurities partially desorbed in said first regeneration step include $CO_2$ and water.

* * * * *